April 22, 1958 F. L. GEARY 2,831,319
VARIABLE AREA NOZZLE
Filed Oct. 25, 1952 2 Sheets-Sheet 2
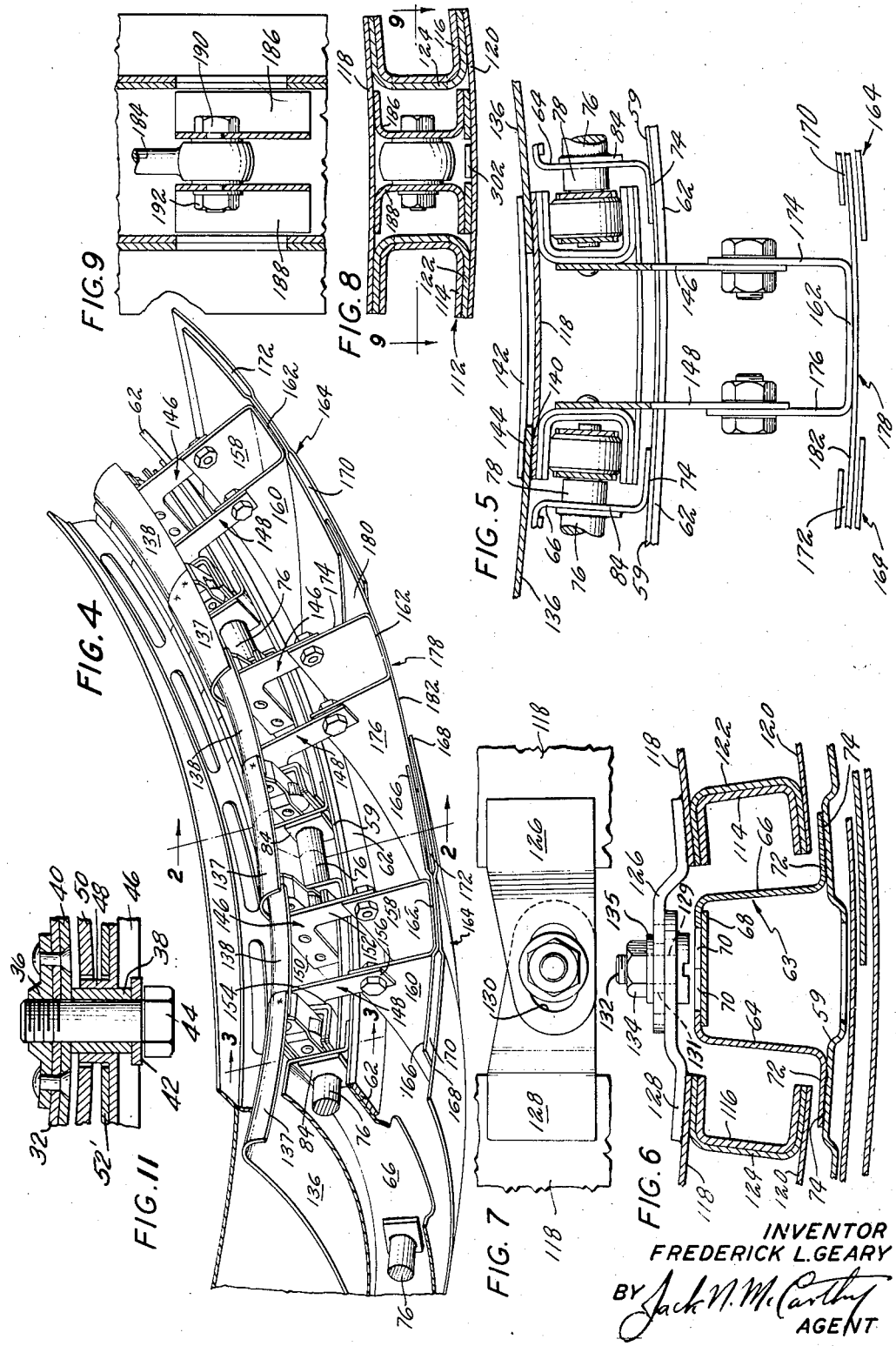
INVENTOR
FREDERICK L. GEARY
BY
AGENT

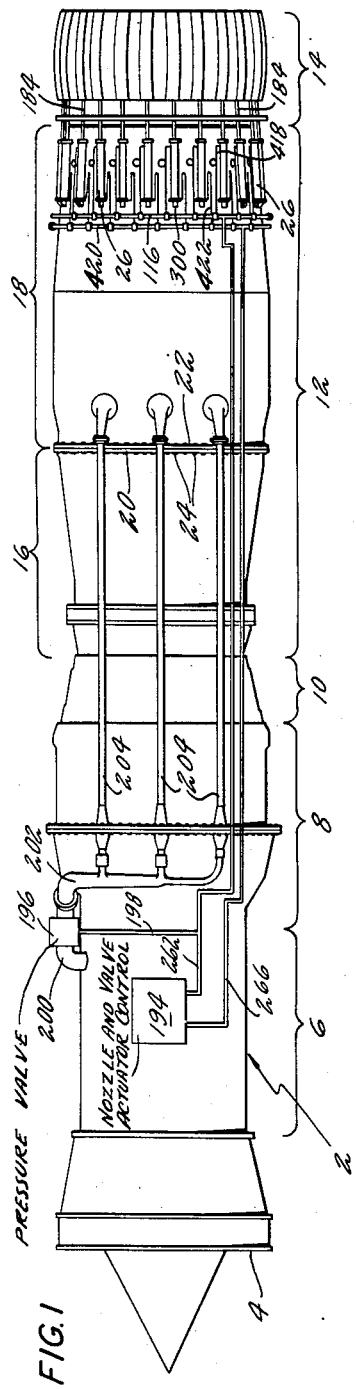

United States Patent Office 2,831,319
Patented Apr. 22, 1958.

2,831,319
VARIABLE AREA NOZZLE

Frederick L. Geary, Springfield, Mass., assignor to United Aircraft Corporation, East Hartford, Conn., a corporation of Delaware Application October 25, 1952, Serial No. 316,911

21 Claims. (Cl. 60—35.6)

This invention relates to a propelling nozzle for a turbojet engine.

An object of this invention is to provide a propelling nozzle in which the operating loads on the linkage which actuates the sliding flaps of the nozzle are held to a minimum.

Another object is to provide a nozzle for a turbojet engine in which the base drag on the airplane structure is held to a minimum.

A further object is to provide a nozzle which can be made continuously variable.

Another object is to provide a nozzle in which the actuating component of the jet gas loads and reactions on the nozzle is reduced or eliminated.

A further object is to provide a nozzle to which fairings may be attached which will fair smoothly with airplane external structure and thus decrease drag in the nozzle by minimizing the break in the external airflow pattern.

Another object of this invention is to provide a nozzle which can be adapted to be a converging-diverging nozzle while keeping an efficient position for the range of operating conditions.

Other objects and advantages will become apparent from the following description.

In the accompanying drawings there is illustrated a suitable mechanical embodiment for the purpose of disclosing the invention. The drawings, however, are for the purpose of illustration only and are not to be taken as limiting or restricting the invention. It will be apparent to those skilled in the art that various changes in the illustrated construction may be made without exceeding the scope of the invention.

Fig. 1 is a view in elevation of a jet engine and afterburner showing the relative position of the nozzle and also showing its operating cylinders.

Fig. 2 is an enlarged view of a section taken through the nozzle showing the nozzle in an open position, phantom lines show the nozzle in a closed position. This view is taken along the line 2—2 of Fig. 4.

Fig. 3 is a view taken along the line 3—3 of Fig. 4 showing one of the trucks on which the sliding flaps are actuated.

Fig. 4 is an enlarged perspective view of a section of the nozzle.

Fig. 5 is a view taken along the line 5—5 of Fig. 2.

Fig. 6 is a view taken on the line 6—6 of Fig. 2.

Fig. 7 is an elevational view of Fig. 6.

Fig. 8 is a view taken along the line 8—8 of Fig. 2.

Fig. 9 is a view taken along the line 9—9 of Fig. 8.

Fig. 10 is a view taken along the line 10—10 of Fig. 3.

Fig. 11 is a sectional view of one of the mounting devices taken on a line passing through the center of bolt 44 as seen in Fig. 2.

Fig. 1 shows a jet engine 2 having an air inlet 4, a compressor section 6, burner section 8, turbine section 10 and having an afterburner 12 and nozzle 14 attached thereto.

The afterburner 12 includes a diffuser section 16 and a burner section 18. These two sections, 16 and 18, are attached together by means of a flange 20 on diffuser section 16 and a flange 22 on the burner section 18. These flanges are held together by bolts 24. Nozzle 14 is attached to the afterburner 12 and is actuated by pistons in cylinders 26 in a manner to be hereinafter described.

As seen in Fig. 2 the burner section 18 of the afterburner is constructed having two shells, an inner shell 28 and an outer shell, or shroud, 30. The specific construction of this afterburner does not form part of this invention and is shown and claimed in the copending application of D. J. Jordan, Serial No. 316,905, filed October 25, 1952, for a Pressurized Afterburner Cooling Shroud and the copending application of E. D. Brown, Serial No. 316,920, filed October 25, 1952, for an Afterburner Shroud Construction.

The nozzle 14 is connected at its forward end to an annular raised portion 32 on the outer shell, or shroud, 30 of the afterburner by a plurality of mounting devices 34. These devices permit relative radial movement between the outer shell 30 of the afterburner and the nozzle 14. Provision for this movement is necessary in view of the extreme temperatures reached in afterburning.

These devices include two units. One unit is fixed in relation to the outer shell and the other unit is fixed in relation to the nozzle. The unit fixed to the outer shell includes a nut 36 on the inner side of the raised portion 32 of the outer shell positioned around a hole through said portion. A sleeve 38 is located with one end against ring 40 which surrounds the raised portion 32. This ring 40 is fixed to the raised portion of the outer shell 30 to reinforce it. This ring 40 has holes therein which coincide each with a hole as mentioned heretofore in the raised portion 32. A washer 42 is located against the other end of sleeve 38, said washer having its internal diameter equal to the internal diameter of the sleeve 38 but with its external diameter being greater than that of the sleeve 38. A bolt 44 extends through said washer 42, sleeve 38, the holes in ring 40 and raised portion 32, and is threaded to nut 36.

The unit fixed to the nozzle consists of a channel member 46 with a bushing 48 fixedly attached thereto. This bushing passes through a hole in a ring member 50 of the nozzle and a hole in a ring member 52 which is attached to ring member 50. This channel member 46 is fixed to a flat portion 52′ on ring 52 which is in turn fixed to the nozzle 14. A flat portion 52′ is provided on ring 52 for each mounting device 34. The bushing 48 slidably engages sleeve 38, the length of the sleeve being longer than that of the bushing 48. As it can now be seen, relative radial movement is permitted between the outer shell and the nozzle by an amount equal to the difference in length between the sleeve 38 and the bushing 48.

A radially extending flange 56 is attached to ring 52 and extends around the entire engine. This is attached to give added strength to the nozzle. A plurality of holes 58 are located in said flange around the circumference of the engine and are used for a purpose to be described later.

The nozzle 14 comprises two main parts, one part including those elements which remain fixed in relation to the engine and the other part including those elements which move in relation to the engine to place the nozzle in an "open" or "closed" position.

The first, or fixed, part of the nozzle includes ring member 50 which is attached to the afterburner as disclosed above. The rear part 59 of this ring member 50 is shaped as a frustum of a hollow sphere or as a "barrel." Elongated slots 60 are spaced equally around the circumference of this member 59. An annular member 62 extends around the free end of said member 59 to strengthen it.

Equally spaced around the inner circumference of the frustum referred to are channel members 63 (see Fig 6). These channel members are formed from members 64 and 66, S shaped in cross section and curved longitudinally so as to fit the inner circumference of the frustum referred to above and a member 68 which is a flat piece used to hold the ends 70 of members 64 and 66 together. The other ends 72 of members 64 and 66 are fixed to member 59 at 74.

Fixed to each channel 63 at its rearward end and at a point between said rearward end and the forward end thereof, is an axle member 76. Each axle member 76 extends through both sides of channel member 63 as shown at 78. The end of each extension 78 has a necked down portion 80. Each necked down portion 80 has an internally threaded bore 82. A flat plate 84 is fixed to each inner side of channel member 63 around axle member 76 and is also fixed to said axle member.

A truck member 86 is mounted on each necked down portion 80 in a manner to be herein described. The truck member 86 consists of two side members 88 and 90. Side member 90 includes integral spacers 92, 94 and 96. Two wheels, or rollers, 98 and 100 are carried by said truck, one wheel 98 being mounted between spacer 92 and spacer 94 and the other wheel 100 being mounted between spacer 94 and spacer 96. The two side members 88 and 90 are held together by rivets 102 and 104. Rivet 102 extends through side plate 88 and spacer 92 of side plate 90. Rivet 104 extends through side plate 88 and spacer 96 of side member 90. Hole 106 extends through side plate 88 and spacer 94 of side member 90. This hole is made to receive a necked down portion 80 of axle member 76. A nut 108 having a head 110 larger in diameter than the diameter of necked down portion 80 is screwed into bore 82.

The second, or movable, part of the nozzle is carried by a plurality of track members 112 (see Fig. 8). These track members include two tracks, 114 and 116, which are supported by plate members 118 and 120. A supporting and reinforcing member 122 is placed between track 114 and plates 118 and 120. A supporting and reinforcing member 124 is placed between track 116 and plates 118 and 120. Track members 112 are curved longitudinally in the same manner as channel member 63. Plate members 118 curve radially outwardly at their rearward end as at 138.

Track members 112 are located one each in the space between adjacent channel members 63 with the two trucks mounted on each side of said channel member being located within the tracks 114 and 116 of said track member. Adjacent plate members 118 are connected to each other by extensions 126 and 128. These extensions are fixed at one end to their respective plate 118 and meet in sliding engagement at their free ends. The free end of extension 128 has located therein a hole 129. The free end of extension 126 has located therein an oblong hole 130, the width thereof being larger than the diameter of hole 129. A washer 131 is located in said oblong hole and is of a slightly greater thickness than the end of extension 126. A bolt 132 having a nut 134 and washer 135 extends through hole 129 and the hole in washer 131 so that said washer is held relatively fixed to extension 128. This permits relative motion between members 126 and 128 along the longitudinal axis of the oblong hole 130.

Plate members 118 of track members 112 form an internal surface with spaces between adjacent plate members 118. This space is spanned by plate members 136, each of which are fixed along one side of plate members 118 at 140. These members 136 also curve radially outwardly at their rearward end along with members 118 as at 137. The other edge of plate 136 is free. Another plate 142 is placed over plate 118 and fixed to the edge of plate 136 which is fixed to plate 118. This is shown at 144. The other edge of plate 142 is free. Plates 118, 136 and 142 form an inner flap member and are curved longitudinally to conform to the shape of channel members 63 and are curved laterally to form the circular nozzle exit.

At the rearward end of each track member 112 there are mounted two angular members 146 and 148. Leg 150 of angular member 146 is attached to the inner side of member 124 with leg 152 projecting radially outward past the end of plate 120. Leg 154 of angular member 148 is attached to the inner side of member 122 with leg 156 projecting radially outward past the end of plate 120. Alternate pairs of angular members 146 and 148 are attached to projections 158 and 160, respectively, which are formed from a channel member 162 and which is fixed to a sliding outer flap member 164. Sliding outer flap member 164 is formed from two curved plate members 166 and 168 which have a space 170 and 172 located therebetween at each end thereof. The pairs of angular members 146 and 148 located between the alternate pairs just referred to are attached to a channel member 162 having projections 174 and 176 which is fixed to a sliding outer flap member 178. The sliding outer flap member 178 which is attached to member 162 consists merely of a plate curved to fit sliding outer flap member 164. The one side 180 of sliding outer flap member 178 fits into space 170 and the other side 182 of the sliding outer flap member fits into space 172. This construction extends around the entire circumference of the nozzle.

At the forward end of each sliding outer flap member there is fixed a hook 302 which faces rearwardly. To attach the forward ends of the moving parts together the hook 302, which passes through hole 60 in member 59, is hooked over the forward end of plate 120.

To actuate said nozzle a plurality of cylinders 26 with pistons therein are provided having control piston rods 184. Each piston rod is attached at its free end to a bracket on said nozzle formed from two members 186 and 188. As seen in Figs. 8 and 9 these two members, 186 and 188, are of channel shape and fixed at one side to plate 118 and fixed at their other side to plate 120. The free end of each piston rod 184 has a hole therethrough which is aligned with two other holes, one of which is in member 186 and the other of which is in member 188. A bolt 190 extends through said holes and has a nut 192 on its end. Each control rod 184 passes through a hole 60 in member 59 which is located between its cooperating cylinder 26 and its bracket on the nozzle. Now as the control rod is moved forward and backward the moving parts of the nozzle 14 move therewith. Each cylinder 26 is pivoted to the afterburner at 300. A cylinder and cooperating structure for actuating said nozzle is provided for each track member 112.

The control piston rods 184 are moved by connecting one end or the other of cylinder 26 to an operating pressure. While the operation of the nozzle can be performed manually, it is preferred that an automatic control be used. An automatic control of a type which could be used is shown and claimed in the application of Richard J. Coar, Serial No. 196,424, filed November 18, 1950, now U. S. Pat. No. 2,715,311 for a Control Device. This control senses when the afterburner goes "on" or "off," and "opens" or "closes" the nozzle accordingly and maintains it in that position. When the afterburner is "on" this nozzle and valve actuator control 194 permits an actuating fluid to be directed by conduit 262 to manifold 116 and in turn delivered to the rearward ends of cylinders 26 by conduit sections 418. This connection holds nozzle 14 "open." When the afterburner is "off" this nozzle and valve actuator control 194 permits an actuating fluid to be directed by conduit 266 to manifold 420 and in turn delivered to the forward ends of cylinders 26 by conduit sections 422. This connection holds nozzle 14 "closed." Conduit sections 418 and 422 are constructed of such a length and configuration so that the cylinders can pivot at 300 and not affect the function of these conduit sections.

A pressure valve 196 regulates the admission of compressed air to the space between the inner and outer shells, 28 and 30, of the afterburner. The type of valve 196 shown is a pressure valve which is "normally closed" and arranged to open when subjected to a predetermined pressure. This valve is connected to conduit 262 by conduit 198 and therefore the proper operation of both the pressure valve 196 and nozzle is obtained. The air from the compressor is carried through pipe 200, headers 202 (only one shown, the other extends down the other side of the engine) and pipes 204 into the space between shells 28 and 30.

At the end of the shell, or shroud, 30 a ring 206 and a flexible circumferential seal member 208 are mounted. The end of the shell 28 forms a fixed area nozzle. The ring 206 is mounted to the outer shell, or shroud, 30 by means of a flange 210 on said outer shell and a flange 212 on said ring. Bolts 214 secure one flange to the other. The free end of ring 206 has a frustroconical section 216 with a flared portion 218. This flared portion 218 is spaced from the free end of the inner shell 28. The dimension of the space is such that when the nozzle 14 is open and the afterburner is "on" the free end of the inner shell will be approximately just in meeting contact with it. A ring of this type is shown and claimed in the application of Frederick L. Geary, Serial No. 284,789, filed April 28, 1952, now U. S. Patent No. 2,735,262 for a Support Means.

Seal member 208 is also mounted on the outer shell 30. A flange 220 on said member is secured to flange 210 by bolts 214. The free end of said seal member 208 contacts the inner surface of plates 136 and 142 to prevent a leak at this point when the nozzle is in a "closed" position. This seal is constructed so that it has a spring action biasing it in a sealing direction. Extensions such as shown at 400 may be added at 137 and 138 of the nozzle to provide a converging-diverging nozzle having extra length in its diverging portion.

Although a specific nozzle has been shown and described herein for purpose of illustration, it will be evident to those skilled in the art that the invention is capable of various modifications and adaptations within the scope of the appended claims. Other specific nozzles are shown in application Serial No. 234,228, application Serial No. 234,256, application Serial No. 284,511, now U. S. Patent No. 2,770,944 and the copending application of Frederick L. Geary and William Granville Taylor, Jr., Serial No. 316,912, filed October 25, 1952 for a Variable Area Nozzle.

I claim:

1. In combination, a duct and a nozzle for controlling the effective area of the discharge end of the duct, said nozzle having a plurality of flaps mounted for slidable movement adjacent the discharge end of the duct, said flaps being slidably mounted on a member attached to said duct, said flaps being of such a length so as to vary the effective area of the discharge end of said duct as the flaps slide, each flap includes track means and a flap member, said first named member having rollers on which said track means slide, said flap members of each flap having a first nozzle forming plate attached to said track means, a second nozzle forming plate attached along an edge to said first named plate and extending to and overlapping an adjacent first nozzle forming plate of an adjacent flap, and a third nozzle forming plate attached along an edge to said second nozzle forming plate and extending to and overlapping an adjacent second nozzle forming plate of an adjacent flap.

2. In combination, a duct and a nozzle for controlling the effective area of the discharge end of the duct, said nozzle having a plurality of flaps mounted for slidable movement adjacent the discharge end of the duct, said flaps being slidably mounted on a member attached to said duct, said flaps being of such a length so as to vary the effective area of the discharge end of said duct as the flaps slide, each flap includes track means, an inner flap member and an outer flap member, said first named member having rollers on which said track means slide, said inner flap members of each flap having a first nozzle forming plate attached to said track means, a second nozzle forming plate attached along an edge to said first named plate and extending to and overlapping an adjacent first nozzle forming plate of an adjacent flap, and a third nozzle forming plate attached along an edge to said second nozzle forming plate and extending to and overlapping an adjacent second nozzle forming plate of an adjacent flap, said outer flap members of each flap having a fairing member attached to said track means, the fairing member of each flap having sliding cooperation with its adjacent flaps.

3. A variable area nozzle including in combination, a barrel-shaped member, a plurality of flaps slidably mounted on said barrel-shaped member, said flaps being of such a length so as to vary the effective area of the free end of the barrel-shaped member as the flaps slide, a plurality of projecting members extending axially of said barrel-shaped member and fitting against its inner periphery, each flap includes track means and a flap member, said projecting members having a roller on each side thereof, said track means of each flap riding on said rollers.

4. A variable area nozzle including in combination, a barrel-shaped member, a plurality of flaps slidably mounted on said barrel-shaped member, said flaps being of such a length so as to vary the effective area of the free end of the barrel-shaped member as the flaps slide, a plurality of projecting members extending axially of said barrel-shaped member and fitting against its inner periphery, each flap including track means and a flap member, said projecting members having a roller on each side thereof, said track means of each flap having two track members, said track members of each flap being located between two projecting members with the roller of one projecting member in one track member and the roller of the other projecting member in the other track member.

5. In combination, a duct and a nozzle for controlling the effective area of the discharge end of the duct, said nozzle having a plurality of flaps mounted for slidable movement adjacent the discharge end of the duct, said flaps being slidably mounted on a member attached to said duct, said flaps being of such a length so as to vary the effective area of the discharge end of said duct as the flaps slide, each flap includes track means and a flap member, said track means including two tracks of channel cross section, said channel members extending longitudinally of its flap, the open side of one of said channel members facing to one side of its flap and the open side of the other channel member facing toward the other side of its flap, said first named member having rollers on which said channel members slide.

6. In combination, a duct and a nozzle for controlling the effective area of the discharge end of the duct, said nozzle having a plurality of flaps mounted for slidable movement adjacent the discharge end of the duct, said flaps being slidably mounted on a member attached to said duct, said flaps being of such a length so as to vary the effective area of the discharge end of said duct as the flaps slide, each flap includes track means and a flap member, said track means including two tracks of channel cross section, said channel members extending longitudinally of its flap, the open side of one of said channel members facing to one side of its flap and the open side of the other channel member facing toward the other side of its flap, said first named member having truck members on which said channel members slide.

7. In combination, a duct and a nozzle for controlling the effective area of the discharge end of the duct, said nozzle having a plurality of flaps mounted for slidable movement adjacent the discharge end of the duct, said flaps being slidably mounted on a member attached to said duct, said flaps being of such a length so as to vary the effective area of the discharge end of said duct as the flaps slide, each flap includes track means and a flap member, said track means including two tracks of channel cross section, said channel members extending longitudinally of its flap, the open side of one of said channel members facing to one side of its flap and the open side of the other channel member facing toward the other side of its flap, said first named member having truck members on which said channel members slide, means for sliding said flaps on said truck members.

8. In combination, a duct and a nozzle for controlling the effective area of the discharge end of the duct, said nozzle having a plurality of flaps mounted for slidable movement adjacent the discharge end of the duct, said flaps being slidably mounted on a member attached to said duct, said flaps being of such a length so as to vary the effective area of the discharge end of said duct as the flaps slide, each flap includes track means and a flap member, said track means including two tracks of channel cross section, said channel members extending longitudinally of its flap, the open side of one of said channel members facing to one side of its flap and the open side of the other channel member facing toward the other side of its flap, said first named member having rollers on which said channel members slide, each flap having sliding cooperation with its adjacent flaps.

9. A variable area nozzle including in combination, an annular member, a barrel-shaped member attached thereto, a plurality of flaps slidably mounted on said barrel-shaped member, said flaps being of such a length so as to vary the effective area of the free end of the barrel-shaped member as the flaps slide, a plurality of projecting members extending axially of said barrel-shaped member and fitting against its inner periphery, each flap including track means and a flap member, said projecting members having a roller on each side thereof, said track means of each flap having two track members, said track members of each flap being located between two projecting members with the roller of one projecting member in one track member and the roller of the other projecting member in the other track member, said flap member of each flap having a first nozzle forming plate attached to said track means, a second nozzle forming plate attached along an edge to said first named plate and extending to and overlapping an adjacent first nozzle forming plate of an adjacent flap, and a third nozzle forming plate attached along an edge to said second nozzle forming plate and extending to and overlapping an adjacent second nozzle forming plate of an adjacent flap.

10. A variable area nozzle including in combination, an annular member, a barrel-shaped member attached thereto, a plurality of flaps slidably mounted on said barrel-shaped member, said flaps being of such a length so as to vary the effective area of the free end of the barrel-shaped member as the flaps slide, a plurality of projecting members extending axially of said barrel-shaped member and fitting against its inner periphery, each flap including track means, an inner flap member and an outer flap member, said projecting members having a roller on each side thereof, said track means of each flap having two track members, said track members of each flap being located between two projecting members with the roller of one projecting member in one track member and the roller of the other projecting member in the other track member, said inner flap member of each flap having a first nozzle forming plate attached to said track means, a second nozzle forming plate attached along an edge to said first named plate and extending to and overlapping an adjacent first nozzle forming plate of an adjacent flap, and a third nozzle forming plate attached along an edge to said second nozzle forming plate and extending to and overlapping an adjacent second nozzle forming plate of an adjacent flap, said outer flap member of each flap having a fairing member attached to said track means, the fairing member of each flap having sliding cooperation with its adjacent flap.

11. In combination, an afterburner and a nozzle for controlling the effective area of the discharge end of the afterburner, said nozzle having a plurality of flaps mounted for slidable movement adjacent the discharge end of the afterburner, said flaps being slidably mounted on a member attached to said afterburner, said flaps being of such a length so as to vary the effective area of the discharge end of said afterburner as the flaps slide, each flap includes track means and a flap member, said first named member having rollers on which said track means slide, a seal member is attached to said afterburner and is constructed so that a spring action biases it in a sealing direction against the flap members of said flaps.

12. A variable area nozzle including in combination, an annular member, a barrel-shaped member attached thereto, a plurality of flaps slidably mounted on said barrel-shaped member, said flaps being of such a length so as to vary the effective area of the free end of the barrel-shaped member as the flaps slide, a plurality of projecting members extending axially of said barrel-shaped member and fitting against its inner periphery, each flap including track means, an inner flap member and an outer flap member, said projecting members having a roller on each side thereof, said track means of each flap riding on said rollers, said inner flap member being connected to said outer flap member at their rear ends by a bracket attached to the outer flap member and angular members attached to the inner flap member.

13. A variable area nozzle including in combination, an annular member, a barrel-shaped member attached thereto, a plurality of flaps slidably mounted on said barrel-shaped member, said flaps being of such a length so as to vary the effective area of the free end of the barrel-shaped member as the flaps slide, a plurality of projecting members extending axially of said barrel-shaped member and fitting against its inner periphery, each flap including track means, an inner flap member and an outer flap member, said projecting members having a roller on each side thereof, said track means of each flap riding on said rollers, said inner flap member being connected to said outer flap member at their rear ends by a bracket attached to the outer flap member and angular members attached to the inner flap member, said inner flap member and outer flap member being attached at their front ends by a hook attached to the outer flap member.

14. A variable area nozzle including in combination, an annular member, a barrel-shaped member attached thereto, a plurality of flaps slidably mounted on said barrel-shaped member, said flaps being of such a length so as to vary the effective area of the free end of the barrel-shaped member as the flaps slide, a plurality of projecting members extending axially of said barrel-shaped member and fitting against its inner periphery, each flap including track means, an inner flap member and an outer flap member, said projecting members having a roller on each side thereof, said track means of each flap riding on said rollers, said inner flap member being connected to said outer flap member at their rear ends by a bracket attached to the outer flap member and angular members attached to the inner flap member, a seal member is attached to said afterburner and is constructed so that a spring action biases it in a sealing direction against the inner flap members of said flaps.

15. A variable area nozzle including in combination, an annular member, a barrel-shaped member attached thereto, a plurality of flaps slidably mounted on said barrel-shaped member, said flaps being of such a length so as to vary the effective area of the free end of the barrel-shaped member as the flaps slide, a plurality of projecting members extending axially of said barrel-shaped member and fitting against its inner periphery, each flap including track means, an inner flap member and an outer flap member, said projecting members having a roller on each side thereof, said track means of each flap riding on said rollers, said inner flap member being connected to said outer flap member at their rear ends by a bracket attached to the outer flap member and angular members attached to the inner flap member, said inner flap member and outer flap member being attached at their front ends by a hook attached to the outer flap member, a seal member is attached to said afterburner and is constructed so that a spring action biases it in a sealing direction against the inner flap members of said flaps.

16. A variable area nozzle including in combination, an annular member, a barrel-shaped member attached thereto, a plurality of flaps slidably mounted on said barrel-shaped member, said flaps being of such a length so as to vary the effective area of the free end of the barrel-shaped member as the flaps slide, a plurality of projecting members extending axially of said barrel-shaped member and fitting against its inner periphery, each flap including track means, an inner flap member and an outer flap member, said projecting members having a roller on each side thereof, said track means of each flap having two track members, said track members of each flap being located between two projecting members with the roller of one projecting member in one track member and the roller of the other projecting member in the other track member, said inner flap member of each flap having a first nozzle forming plate attached to said track means, a second nozzle forming plate attached along an edge to said first named plate and extending to and overlapping an adjacent first nozzle forming plate of an adjacent flap, and a third nozzle forming plate attached along an edge to said second nozzle forming plate and extending to and overlapping an adjacent second nozzle forming plate of an adjacent flap, means for actuating said flaps, said means including a cylinder mounted on said afterburner and a piston in said cylinder for each flap, said piston being connected by a piston rod to a flap to transmit the movement of the piston to said flap.

17. In combination, a duct having an outlet, a mounting member positioned around said duct adjacent to the outlet, a plurality of flaps, a plurality of members projecting radially inwardly from said mounting member, each flap including track means, said projecting members having a roller on each side thereof, said track means of said flaps engaging said rollers, means for actuating said flaps, said flaps being of such a length so as to vary the effective area of said outlet.

18. In combination, a duct having an outlet, a mounting member positioned around said duct adjacent to the outlet, a plurality of flaps, a plurality of members projecting radially inwardly from said mounting member, each flap including track means, said projecting members having a roller on each side thereof, said track means including two tracks of channel cross section, said tracks extending longitudinally of its flap, the open side of one of said tracks facing to one side of its flap and the open side of the other flap facing toward the other side of its flap, said track means of said flaps engaging said rollers, means for actuating said flaps, said flaps being of such a length so as to vary the effective area of said outlet.

19. In combination, a duct having an outlet, a mounting member positioned around said duct adjacent to the outlet, a plurality of flaps, a plurality of members projecting radially inwardly from said mounting member, each flap including track means and a flap member, said flap member of each flap having a forward end and a rearward end, said track means being connected to said flap member between said ends, said projecting members having a roller on each side thereof, said track means of said flaps engaging said rollers, means for actuating said flaps, said flaps being of such a length so as to vary the effective area of said outlet.

20. In combination, a duct having an outlet, a mounting member positioned around said duct adjacent to the outlet, a plurality of flaps, a plurality of members projecting radially inwardly from said mounting member, each flap including track means projecting radially outwardly, said projecting members having a roller on each side thereof, said track means of said flaps engaging said rollers, means for actuating said flaps, said flaps being of such a length so as to vary the effective area of said outlet.

21. In combination, a duct having an outlet, a mounting member positioned around said duct adjacent to the outlet, a plurality of flaps, a plurality of members projecting radially inwardly from said mounting member, each flap including track means projecting radially outwardly, each track means projecting between two of said members projecting radially inwardly, said projecting members having a roller on each side thereof, said track means of said flaps engaging said rollers, means for actuating said flaps, said flaps being of such a length so as to vary the effective area of said outlet.

References Cited in the file of this patent

UNITED STATES PATENTS

| | | |
|---|---|---|
| 2,603,060 | Brown | July 15, 1952 |
| 2,637,163 | Brown et al. | May 5, 1953 |
| 2,693,078 | Laucher | Nov. 2, 1954 |

FOREIGN PATENTS

| | | |
|---|---|---|
| 607,686 | Great Britain | Sept. 3, 1948 |